April 20, 1954 W. G. LUNDQUIST 2,675,791
INTERNAL-COMBUSTION ENGINE
Filed Sept. 30, 1950 3 Sheets-Sheet 1
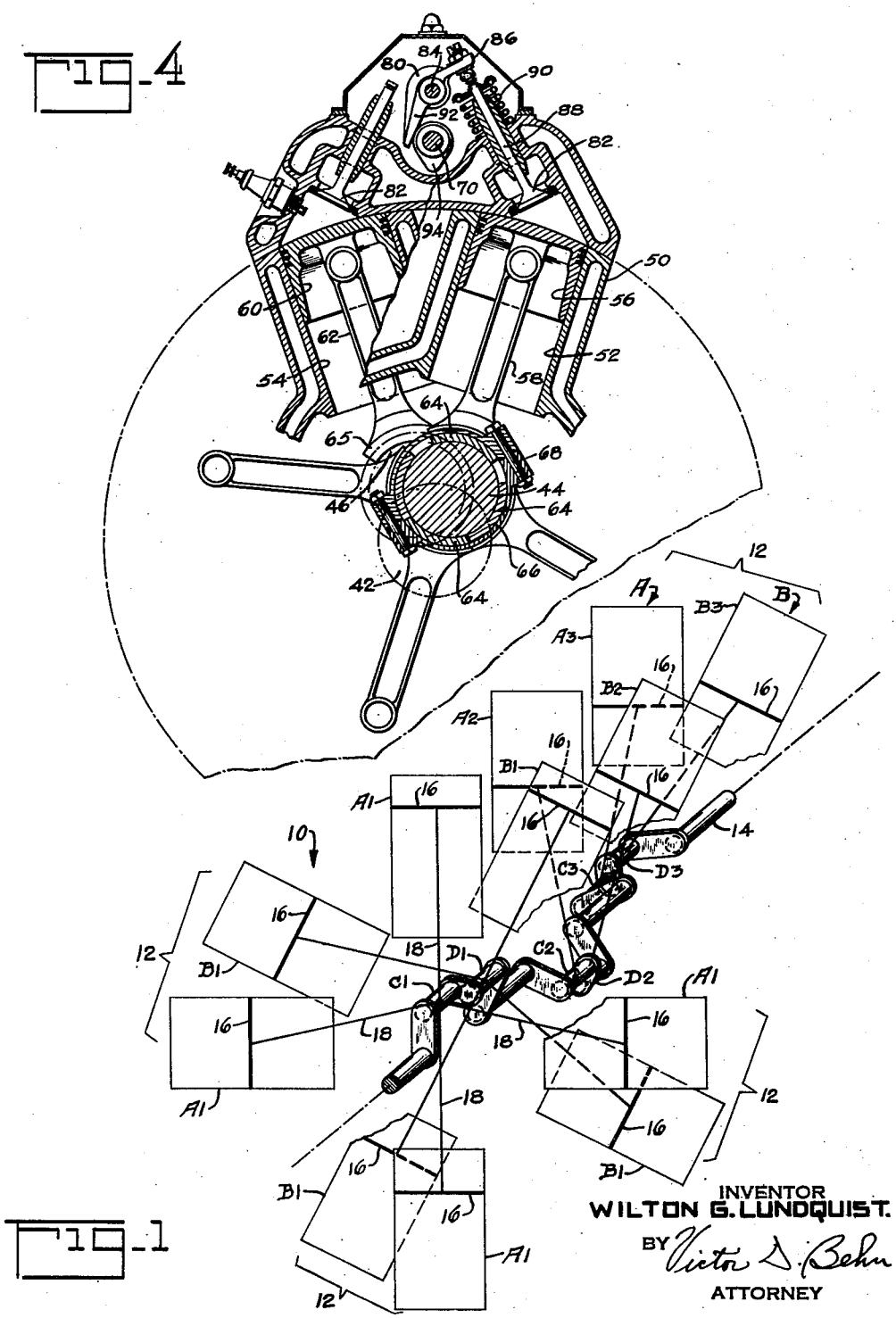
INVENTOR
WILTON G. LUNDQUIST.
BY
ATTORNEY

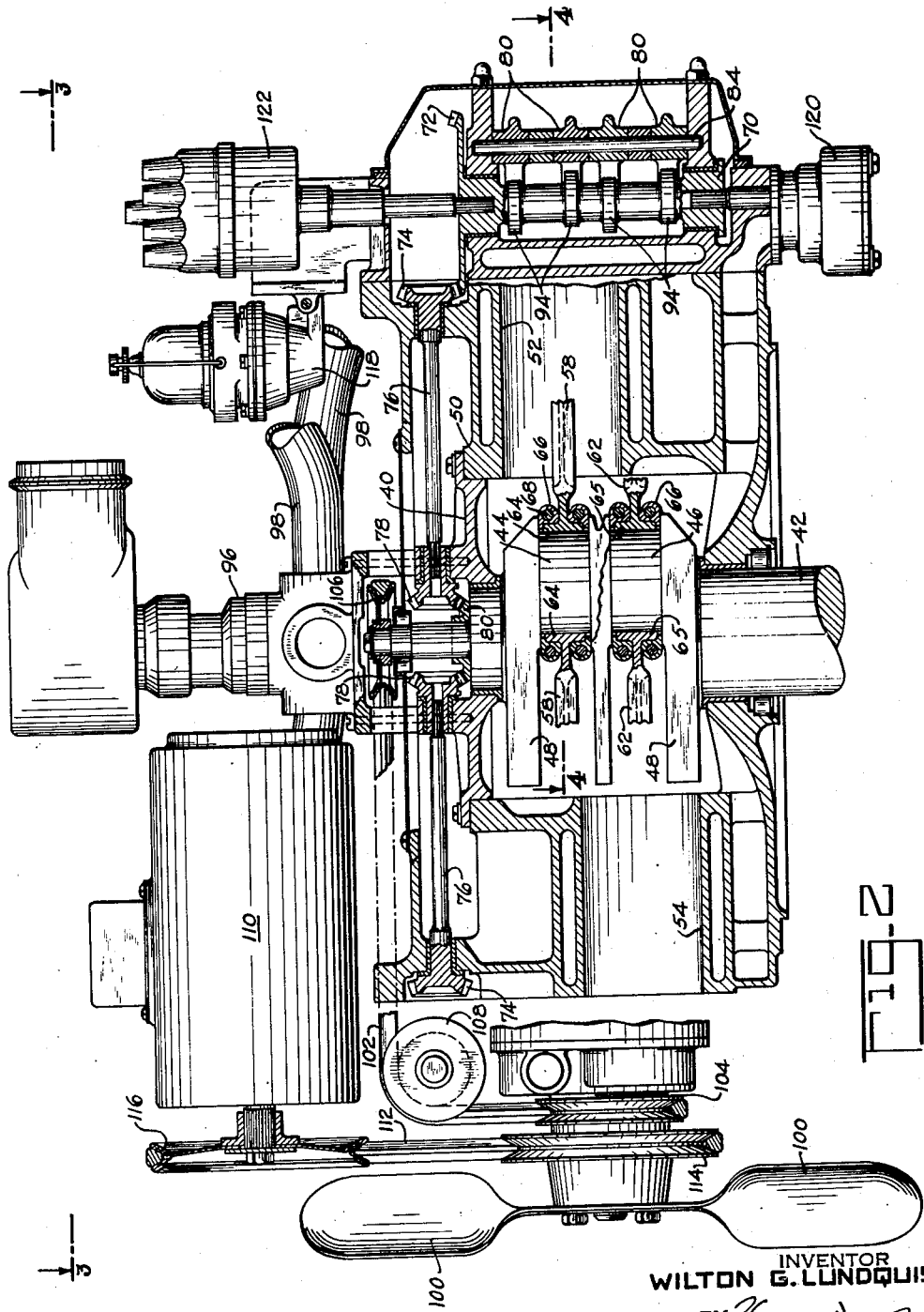

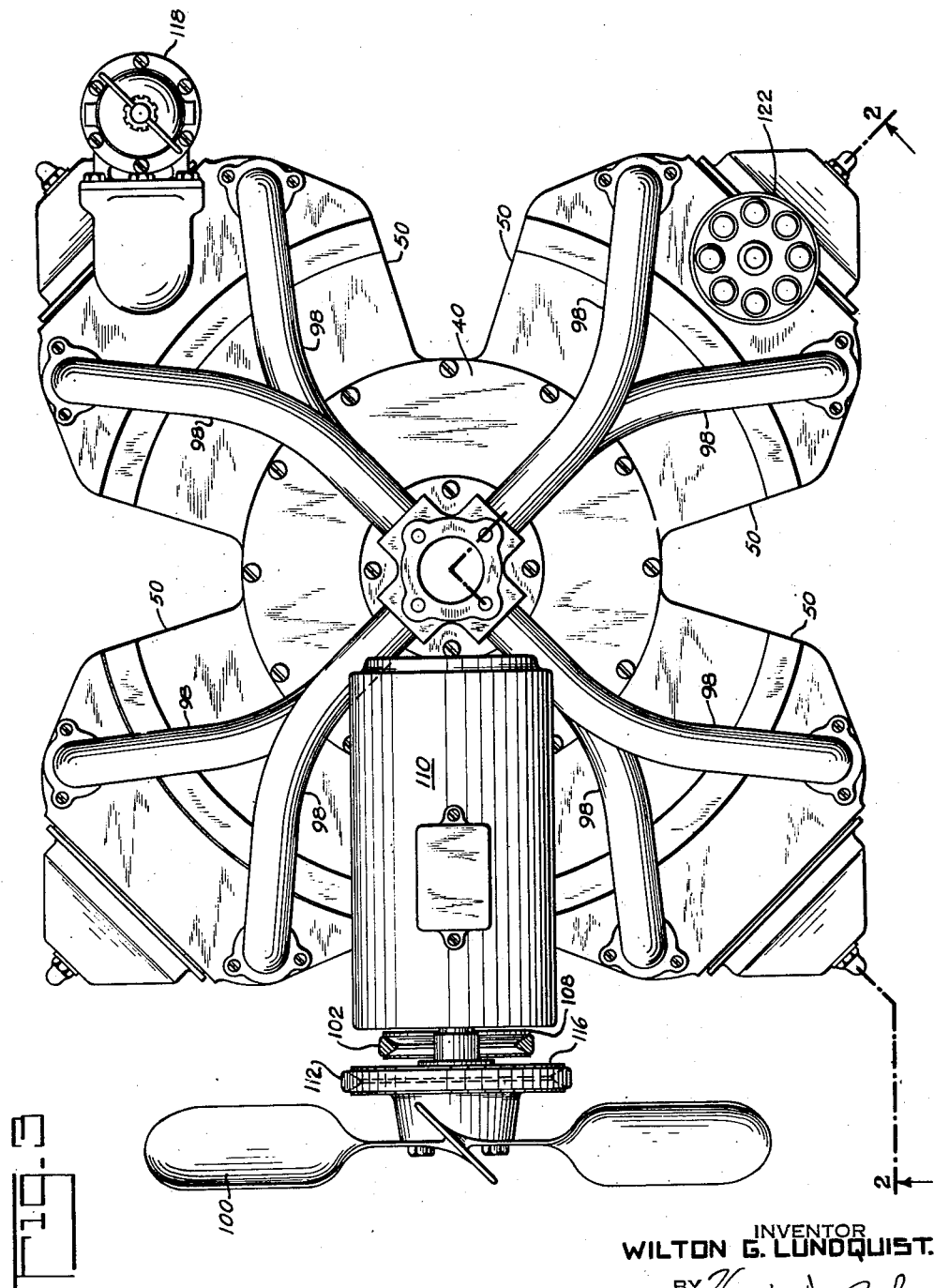

Patented Apr. 20, 1954

2,675,791

UNITED STATES PATENT OFFICE 2,675,791

INTERNAL-COMBUSTION ENGINE

Wilton G. Lundquist, Hohokus, N. J., assignor to Curtiss-Wright Corporation, a corporation of Delaware Application September 30, 1950, Serial No. 187,768

1 Claim. (Cl. 123—55)

This invention relates to internal combustion engines and constitutes an improvement over the disclosure of applicant's prior Patent No. 2,466,550 granted April 5, 1949.

Said prior patent discloses a multi-cylinder internal combustion engine having a plurality of pairs of side-by-side in-line cylinder rows with said pairs of cylinder rows being symmetrically spaced about the axis of the crankshaft structure, there being an equal odd number of cylinders in each row. In addition, in said prior patent, the cylinders of each row are arranged to fire at uniform intervals with the adjacent cylinders of each row being arranged to fire 360 degrees out of phase as regards engine cycle whereby the adjacent pistons of each row are in phase as regards their motion. Said prior patent also discloses a novel eight cylinder internal combustion engine comprising four pairs of parallel cylinders. With the cylinder arrangement of said prior patent, the cylinders of each pair have parallel bores and because of this fact the crankshaft structure is somewhat complicated. Thus with the arrangement illustrated in Figure 1 of said prior patent, two or more parallel crankshafts are required. An object of the present invention comprises the provision of a multi-cylinder internal combustion engine having only a single crankshaft but retaining the advantages of the cylinder arrangement and firing sequence of said prior patent. Thus as compared to the crankshaft structure of said prior patent, the crankshaft structure of the present invention not only is simpler but also permits a reduction in the overall diameter of the engine.

In accordance with the present invention, the axes of all engine cylinders are radially disposed relative to the crankshaft axis and the axes of each pair of side-by-side cylinders instead of being parallel, as in said patent, are inclined to each other. In addition, each pair of adjacent cylinders are offset axially along the crankshaft axis and their pistons are connected to crankpins which are angularly offset about the crankshaft to the same extent and in the same rotative direction as said cylinders whereby as in said prior patent the pistons of each said cylinder pair are in phase as regards their motion and said cylinders can be made to fire 360 degrees out of phase as regards engine cycle.

A further object in the present invention comprises the provision of a novel eight cylinder internal combustion engine embodying said cylinder arrangement.

Other objects of the invention will become apparent upon reading the annexed detailed description in connection with the drawing in which;

Figure 1 is a diagrammatic view of an internal combustion engine embodying the invention;

Figure 2 is a view partly in a section illustrating an improved eight cylinder engine also embodying the invention;

Figure 3 is a view taken along line 3—3 of Figure 2 with the carburetor removed; and Figure 4 is a sectional view taken along line 4—4 of Figure 2.

Referring first to Figure 1 of the drawing, a four-stroke-cycle internal combustion engine 10 is illustrated as comprising a plurality of cylinder blocks 12 symmetrically spaced about the axis of the engine crankshaft 14. As illustrated there are four cylinder blocks 12 and each cylinder block 12 comprises two side-by-side or adjacent in-line rows of cylinders A and B with three cylinders A1, A2 and A3 in row A and with an equal number of cylinders B1, B2 and B3 in row B. Thus each cylinder block 12 comprises three pairs of adjacent A and B row cylinders, namely pair A1 and B1, pair A2 and B2 and pair A3 and B3. The cylinders of each of said rows are disposed in a row which is parallel to the axis of the single engine crankshaft 14. In Figure 1, all the cylinders of the upper cylinder block 12 have been illustrated but for reasons of clarity only the first pair of cylinders A1 and B1 of the other cylinder blocks 12 have been illustrated.

All the engine cylinders are radially disposed relative to the axis of the engine crankshaft 14 and the cylinders of each B row of cylinders are angularly offset to the same extent and in the same rotative direction about said axis from the cylinders of the adjacent A row. In addition each cylinder of each B row of cylinders is axially displaced slightly along the crankshaft axis from its paired or adjacent A row cylinder so that the pistons 16 of each pair of adjacent A and B row cylinders are connected to different crankpins on the single crankshaft 14.

As illustrated, the crankshaft 14 comprises three pairs of crankpins, the first pair of crankpins being designated C1 and D1, the second pair being designated C2 and D2 and the third pair being designated C3 and D3. The C1, C2 and C3 crankpins may be termed the C crankpins and said crankpins serve the cylinders of each A row while the other crankpins D1, D2 and D3 may be termed the D crankpins, said latter crankpins serving the cylinders of each B row. Thus the C1, C2 and C3 crankpins are connected by connecting rods 18 to the pistons 16 of all the A1, A2 and A3 cylinders, respectively, and the crankpins D1, D2 and D3 are similarly connected to the pistons 16 of all the B1, B2 and B3 cylinders. Obviously all the cylinders served by a single crankpin have coplanar axes.

With three cylinders in each A and B row as illustrated, the three pairs of crankpins are angularly offset 360 degrees divided by three or 120 degrees from each other whereby the cylinders of any one row can be fired at uniform firing intervals. The angular offset of each D crankpin from its adjacent or paired C crankpin is to the same extent and in the same rotative direction about the crankshaft axis as each B row of cylinders is angularly offset about said axis from its adjacent A row of cylinders. With this arrangement, the pistons of each adjacent pair of A and B row cylinders are in phase as regards their motion. In addition each adjacent pair of A and B row cylinders is arranged to fire 360 degrees out of phase as regards engine cycle. Therefore, as in my said prior patent, not only will no two cylinders fire at the same time but there will be a uniform firing interval between all firing strokes. Furthermore, as in said prior patent, this obviously highly desirable result is obtained regardless of the number of cylinder blocks 12 or the number of cylinders in each row A and B provided there are an equal odd number of cylinders in each row and provided the number of cylinder blocks 12 is different from the number of cylinders in each row. In addition, just as in said prior patent, there is a uniform firing interval between the firing strokes of the cylinders of any one cylinder block 12. Because of this latter fact each cylinder block 12 can be separately developed as a complete engine and the size of an engine can be increased by adding additional such cylinder blocks symmetrically about the crank shaft axis.

From what has been said, it should be apparent that the cylinder arrangement and firing sequence of the present invention retains all the advantages of the cylinder arrangement and firing sequence of my said prior patent with a much simpler crankshaft construction.

By making the angular offset between the cylinders of the A and B cylinder rows small, the valves of the cylinders of each cylinder block can be operated by a single cam shaft disposed between and adjacent to the head ends of each pair of A and B cylinders as best seen in Figure 4. This results in a very compact valve gear construction. Thus in a transverse slice through the engine illustrated in Figure 1, said slice comprising the cylinders served by a single pair of C and D crankpins, said angular offset is made less than 360 degrees divided by the total number of cylinders served by said pair of crankpins. For example with each pair of C and D crankpins serving eight cylinders, as illustrated in Figure 1, it has been found satisfactory to make this offset equal to approximately 35 degrees. Furthermore since said angular offset of each pair of A and B cylinders is equal to the angular offset of each pair of C and D crankpins, if the angular offset is small then the crankpins of each said pair will overlap as illustrated.

In Figure 1 each cylinder block 12 has a plurality of pairs of A and B cylinders. As explained in my said prior patent, if each cylinder block has only a single pair of cylinders the resulting engine has the inherent advantage that all shaking forces of a frequency higher than crankshaft speed cancel each other, the shaking forces of crankshaft frequency being balanced by the usual counterweight construction. Figures 2, 3 and 4 illustrate such an arrangement comprising eight cylinders. Thus the engine of Figures 2, 3 and 4 may comprise the A1 and B1 cylinders of Figure 1 with the single pair of crankpins C1 and D1 serving said cylinders.

Referring now to Figures 2, 3 and 4, the eight cylinder engine comprises a crankcase 40 within which a crankshaft 42 is journaled. The crankshaft 42 has a pair of crankpins 44 and 46 which are angularly offset about the crankshaft axis. This angular offset is sufficiently small that said crankpins overlap as is clearly shown in Figure 4. The crankshaft 42 also has the usual counterweights 48. Four cylinder blocks 50 are symmetrically mounted on the crankcase about the crankshaft, each cylinder block comprising cylinders 52 and 54. The cylinder 52 of each block 50 is angularly offset from the cylinder 54 of said block to the same extent and in the same rotative direction about the crankshaft axis as the crankpin 44 is angularly offset from the crankpin 46. A piston 56 is slidable in each cylinder 52 and each said piston is connected to the crankpin 44 by a connecting rod 58. Similarly a piston 60 is slidable in each cylinder 54 and each said piston 60 is connected to the crankpin 46 by a connecting rod 62. Thus the axes of the cylinders 52 are disposed in a plane which passes through the crankpin 44 approximately midway of its length and the axes of the cylinders 54 are disposed in a plane which passes through the crankpin 46 approximately midway of its length whereby each cylinder 54 is displaced along the crankshaft axis relative to its adjacent cylinder 52.

As illustrated, the connecting rods 58 and 62 comprise a conventional slipper-type connecting rod construction in which the crankshaft ends of said rods 58 and 62 have slippers 64 and 65, respectively, fitted about a portion of their respective crankpins. Split rings 66, secured together by bolts 68, are disposed about said slippers to maintain said slippers in engagement with their respective crankpins. Any other connecting rod structure, however, could be substituted for the conventional slipper-type connecting rod structure illustrated.

A cam shaft 70 is journaled in each cylinder block 50 between and adjacent to the head end of the two cylinders 52 and 54 of said block. Each said cam shaft 70 has a bevel gear 72 on one end meshing with a bevel gear 74 on a radially disposed shaft 76. In addition each shaft 76 has a bevel gear 78 on its crankshaft end meshing with a bevel gear 80 on said crankshaft whereby the cam shafts 70 are all driven from the crankshaft 42 through the radial shafts 76. Each cylinder block 50 also has a shaft 84 about which are journaled four rocker members 80, one for each of the cylinder valves 82 of said block 50, each cylinder 52 and 54 having the usual two valves. Each rocker member 80 has an arm 86 having a push-pull connection with a stem 88 of a valve 82, as illustrated in Figure 4. A spring 90 urges each valve 82 in a closing direction. Each rocker member 80 also has a second arm 92 engageable with a cam 94 on the cam shaft 70 for opening its cylinder valve 82. This results in a compact valve gear construction.

The engine of Figures 2, 3 and 4 is particularly suitable for automotive use. For this purpose said engine preferably is mounted with the crankshaft axis vertical and with the engine carbureter and intake manifold 96 mounted on the engine crankcase 40 co-axially with and above the engine crankshaft 42 whereby the intake pipes 98 to the various engines cylinders can all have substantially the same length and the same disposition relative to their respective cylinders. This arrangement facilitates equal distribution of charge to the engine cylinders. The engine is also provided with a cooling fan 100 which is supported on engine crankcase (by means not shown). The fan 100 is driven by a belt 102, said belt driving the fan pulley 104 from the crankshaft pulley 106. An idler pulley 108 is interposed so that the fan can rotate about a horizontal axis at right angles to the crankshaft axis. The engine may also be provided with a generator 110 which is driven by the belt 102 through a second belt 112 disposed around pulleys 114 and 116 on the fan 100 and generator 110 respectively.

With the arrangement described, the various engine's auxiliaries such as fuel pump 118, oil pump 120, distributor 122, etc. can be driven from the ends of the cam shafts 70, as best seen in Figure 2.

While I have described my invention in detail in its present preferred embodiment, it will be obvious to those skilled in the art, after understanding my invention, that various changes and modifications may be made therein without departing from the spirit or scope thereof. I aim in the appended claim to cover all such modifications.

I claim as my invention:

An eight cylinder internal combustion engine comprising a crankshaft having first and second crankspins angularly offset less than 45° about the axis of said crankshaft; four cylinder blocks symmetrically spaced about the axis of said crankshaft, each of said cylinder blocks having a pair of first and second cylinders each with its own combustion chamber with said cylinders being disposed radially relative to said crankshaft axis and with the first cylinder of each pair being angularly offset about the crankshaft axis from the second cylinder of said pair to the same extent and in the same rotative direction as said first crankpin is angularly offset from said second crankpin; a piston for each of said first cylinders operatively connected to the first crankpin; a piston for each of said second cylinders operatively connected to said second crankpin; four cam shafts, one for each pair of said first and second cylinders, each said cam shaft being drivably connected to the crankshaft and being disposed parallel to the crankshaft axis outwardly of and between its associated pair of cylinders for operating the valves of said pair of cylinders; and a plurality of engine accessories each drivably connected to an end of one of said cam shafts.

References Cited in the file of this patent

UNITED STATES PATENTS

| Number | Name | Date |
| --- | --- | --- |
| 986,982 | Herreshoff | Mar. 14, 1911 |
| 1,202,741 | Landgraf | Oct. 24, 1916 |
| 1,322,579 | Kenen | Nov. 25, 1919 |
| 1,531,430 | Wrentmore | Mar. 31, 1925 |
| 1,847,560 | Hermann | Mar. 1, 1932 |
| 1,882,448 | Roche | Oct. 11, 1932 |
| 1,967,596 | Schubert | July 24, 1934 |
| 1,986,549 | Woolson | Jan. 1, 1935 |
| 2,425,156 | Knight | Aug. 5, 1947 |
| 2,426,873 | Hasbrouck et al. | Sept. 2, 1947 |

FOREIGN PATENTS

| Number | Country | Date |
| --- | --- | --- |
| 525,538 | France | June 11, 1921 |